United States Patent Office 3,275,447
Patented Sept. 27, 1966

3,275,447
PROCESS FOR THE PREPARATION OF HIGHLY
CONCENTRATED DRY HOPS BY FREEZING
Adam Müller, Coburg, Germany, assignor to Dr. A.
Muller Chemisches Laboratorium, Coburg, Germany, a
corporation of Germany
No Drawing. Filed Aug. 2, 1963, Ser. No. 299,488
Claims priority, application Germany, Aug. 8, 1962,
C 27,665
13 Claims. (Cl. 99—50.5)

The invention relates to a novel process for the preparation of a dry hops concentrate which contains substantially all of the lupulin components or bitter principles of the hops.

Hops concentrates have been prepared by organic solvent extraction methods and by dry methods. Dry methods of forming hops concentrates have not been completely successful since substantial losses of the bitter principles occur when discarding a portion of the strobile bracts which are the major component of raw hops. Known dry processes for forming hops concentrates high in lupulin values comprise separating the leaf and stem residues and the lupulin components by coarse flaking and screening of the hop strobiles or by fine comminution of the hops. However, complete recovery of the lupulin components has not been possible by these known dry methods and therefore only hop extracts produced by organic solvent extraction have gained commercial importance.

German patents Nos. 816,389 and 914,962 describe comminution apparatus with a speed of 80 r.p.m. for flaking of hops at room temperature. As described in "Die Brauerei," Tageszeitung für Brauerei, March 31, 1958, page 143, the flaking operation must be carried out gently with loosely packed material to absolutely avoid shearing, squeezing or pressing of the hops in order to recover the major part of lupulin from the leaves by screening.

U.S. Patent No. 2,833,652 describes a process of preparing a hops concentrate by careful tumbling, shaking, etc., of frozen hops to separate the lupulin therefrom but a complete recovery of the lupulin is not possible and a substantial portion of the lupulin remains with the leafly residue or waste.

Up to the present time, it has been believed that substantial humulon components are contained in the leaves, stems, etc. of the strobiles in addition to the lupulin glands (Luers "Die wissenschaftlichen Grundlagen von Mälzerei und Brauerei," Verlag Hans Carl, Nürnberg, 1950, page 72). This conclusion was reached because it was believed that lupulin could be completely removed from the hop bracts by manual methods and hop resins were known to be found in the residue of hop bracts after this operation. It has now been found that, while at room temperature, complete separation of the lupulin from the hop bracts, stems, etc., is not possible, the process of the invention permits complete separation of the bitter principles or lupulin from the bracts and shows that the small amount of total resin located outside of the lupulin glands has an entirely different quantitative composition than has been previously assumed. The total resins outside the lupulin glands are not satisfactory for brewing purposes as can be seen by their high hard resin content and the extremely low humulon content. Also, methanol extracts containing hop resins precipitate not only lead humulate when treated with lead acetate but also other materials especially with low concentrations of humulon so that accurate analysis is possible only by spectrophotometric means.

It is an object of the invention to provide a novel process for completely recovering all lupulin components from hops.

It is another object of the invention to provide a novel process for preparing hops concentrates having a high lupulin content by a dry method.

It is a further object of the invention to provide a hops concentrate having finer, more noble bitter principles.

These and other objects and advantages of the invention will become obvious from the following detailed description.

The process of the invention for the preparation of a hops concentrate which contains substantially all the lupulin values in the hops comprises freezing the hops wherein the lupulin forms distinct particles, comminuting the frozen hops to a particle size of 200 to 6000 microns whereby the lupulin particles are freed from the hops, separating the comminuted hops into a coarse fraction containing no lupulin and a fine fraction containing substantially all the lupulin in the hops and recovering the fine fraction.

The hops are frozen to a temperature of less than $-10°$ C., preferably to a temperature of $-15$ to $-30°$ C., although lower temperatures may be used. The said temperatures are necessary in order to form the lupulin particles which are often sintered together into clumps. The deep-freezing may be effected in a freezing chamber or by evaporation of liquids having a low boiling point such as carbon dioxide, liquid nitrogen, etc.

By comminuting the hops to a particle size of 200 to 6000 microns, all of the lupulin glands, even those anchored in cone-like fashion in the leaf parenchyma of the strobile bracts, are separated from the hops in the form of individual beads so that a considerable savings in hops can be achieved during hopping of the würze due to the larger surface area of the bitter principle carriers.

The process of U.S. Patent No. 2,833,652 could not effect a complete separation of the lupulin from the strobile bracts because while the tackiness of the lupulin is eliminated by the deep freeze method the strobile bracts of the hops are not smooth and the lupulin drains are seated to a large extent in niche-shaped leaf portions such as the fork of two leaf nerves or in the leaf base itself. The gentle shaking and screening of the said patent does not loosen the frozen lupulin particles from these areas sufficiently to completely recover all the lupulin. Also, when hops are dried, the strobile bract shrinks and many lupulin particles are enveloped by the bract even though they no longer adhere to the strobile bract.

The comminuting of the strobiles and stems of the deep-frozen hops is effected by strong inert gas whirlpools such as air, carbon dioxide or other inert gases which form gas eddies. When the deep frozen hops are torn apart in this fashion, the frozen lupulin particles are completely freed from all parts of the hops, even from the leaf parenchyma. The hops need only be frozen when using the process of the invention and immersion of the hops into liquid air or by the addition of solid carbon dioxide snow to the hops is superfluous and uneconomical.

The rate of flow of the gas eddies and the temperature prevailing during the milling of the hops determines the degree of comminution of the hops. For example, when the hops are deep frozen at about $-30°$ C., gas whirlpools of about 50 meters per second are sufficient to comminute the hops to 200 to 6000 microns and to force all the lupulin from the hops. If the hops are deep-frozen to a temperature of about $-15°$ C., gas whilpools of about 100 meters per second will achieve the desired effect.

The use of the gas whirlpools does not require the extreme low temperatures required by prior art methods such as described in U.S. Patent No. 2,833,650 and is therefore more economical.

For the purpose of comminution of the hops by means of whirlpools with about 100 meters per second or more and a deep-freezing of about −15° C., jet mills are suitable which comminute 90% of the material in the whirlpool and about 10% mechanically. For comminution of the hops and separation of lupulin at about −30° C., whirlpools produced by high speed cutter or beater mills, etc., at about 50 meters per second are sufficient in order to bring about a complete release of the lupulin. The comminution of the hops by means of jet mills is advantageously preceded by a coarse preliminary comminution. The subsequent comminution may be performed in rotating jet mills wherein the rotor is provided with a ventilator and produces compressed air or gas eddies. For the purpose of intensifying the eddy formation, these jet mills may have alviolo-like projections on the rotor or stator which themselves cause additional eddy formations. In these air or gas eddies, the hops introduced by a feed device are torn apart and comminuted. However, jet mills without rotating elements may also be used. In this case highly compressed streams of gases are blown through nozzles into the milling chamber consisting of a ring-shaped container and there expand. The hops are brought together with the gas streams by means of a feed device. In each case the high dilation forces caused by the expanded air or gas eddies act upon the hop bracts, etc. By virtue of this distortion of the hop components to all sides and in combination with the comminuting action—due to the collision of the hop parts among themselves and the impingement upon the mill components—it is possible to effect a complete separation of the bitter principle carrier from the leaf parentchyma even at less severe deep-freeze temperatures. The cooling means comprised by individual beater or cutter mills are not sufficient for the required deep-freezing of the material to be milled, but are just enough to prevent the milling tools from heating up during the milling process.

The separation of the hop components from lupulin may be effected by any desired type of sifter having a mesh of 200 to 500 microns and is effected in the cold, preferably at the comminution temperatures. The use of a rotation or vibration sifter is particularly preferred when high-speed beater or cutter mills are employed. The comminuted material is separated into a coarse fraction and a fine fraction and the fine fraction contains all of the components of the hops which are of value for brewing including all of the tanning agent component in lupulin. The tanning agent content of the fine fraction can be selectively increased by further sifting by the addition of hop leaves rich in tanning agent.

The fine fraction of hops concentrate contains the bitter and aromatic principles in concentrated form and may be stored for several years without deterioration in light and air-tight containers under an inert gas atmosphere such as carbon dioxide or nitrogen.

By stepwise evacuation of the storage containers before sealing, it is possible to selectively eliminate certain aroma components having a low boiling point from the hops concentrate whereby a hops concentrate with a finer, more noble bitter principle is obtained. By evacuation of the volatile components which accompany the hops concentrate, the unpleasantly acting volatile components of purely stored or purely preserved hops can be eliminated. The stepwise evacuation of the fine product fraction produced pursuant to the invention permits a much better selection and refinement of the aroma than is possible to achieve by evacuation of the raw hops.

Not only dried hops but also green hops with a water content of 60–80% can be separated into a coarse fraction free from lupulin and a fine fraction containing lupulin by the process of the invention. Since the water content of the green hops is primarily located in the strobile bracts, the water content of the fine fraction is separated by freeze-drying in the process and the hops concentrate obtained from green hops is in no way inferior to the concentrate prepared from dried hops with respect to shelf life, etc.

In the following examples there are described several preferred embodiments to illustrate the invention. However, it should be understood that the invention is not intended to be limited to the specific embodiments.

*Example I*

5 kgm. of dried hops were cooled to −30° C. and were comminuted to about 1000 microns in a high speed beater mill provided with a cooling stream. The milled material obtained was separated into a coarse fraction and a fine fraction containing substantially all of the humulon by passing it through a vibrating screen with a mesh size of 280 microns at about −30° C.

*Example II*

5 kgm. of dried hops were cooled to −15° C. and were comminuted in a jet mill fed with air or inert gas eddies of about 100 meters per second. The comminuted hops were then separated into a coarse and a fine fraction by passage through a vibrating screen with a mesh width of 200 microns. The said fractions were analyzed and the results are summarized in Table I.

TABLE I

| Fine product fraction | Water-free, percent | Percent of Total Resin |
|---|---|---|
| Total resins | 67.5 | |
| Soft resins | 64.0 | 94.8 |
| Humulon (spectrophotometric) | 25.2 | 37.4 |
| β-Component | 38.8 | 57.5 |
| Hard resins | 3.5 | 5.2 |
| Bitter value according to Wollmer | 29.5 | |
| Coarse product fraction | | |
| Total resins | 1.8 | |
| Soft resins | 0.9 | 49.8 |
| Humulon (spectrophotometric) | 0.1 | 5.5 |
| β-Component | 0.8 | 44.3 |
| Hard resins | 0.9 | 50.2 |
| Bitter value according to Wollmer | 0.18 | |

The results of Table I show that the fine fraction contains all of the main bitter principle carriers (humulon) except for 0.18% contained in the coarse fraction which loss is substantially nil and of the same order as obtained by solvent extraction of hops.

The present teaching of the art is that substantial humulon components are found not only in the lupulin glands but also in the strobile leaves, stems, etc. For instance, Wildner (Wochenschrift für Brauerei 50, Nr. 37, S. 289–294 (1933)) gives a summary in Tables 3 and 4 which shows that despite the most careful separation of lupulin, hop meal, strobile leaves, strobile stems and strobile spindles, all of the strobile components contain a total resin content containing 96.1% soft resins (38.5% humulon and 57.5% β-component) and 3.9% hard resins.

In contrast to this teaching, the coarse fraction of the present example has a total resin content consisting of 49.8% soft resins (5.5% humulon and 44.3% β-component) and 50.2% hard resins which is useless for brewing purposes because of the high hard resin content and the very low humulon content. This analysis shows that contrary to the present teaching of the art a complete separation of the bitter principle carriers from the bracts (course fraction) is possible and that the small amount of resin outside of the lupulon glands has an entirely different composition than has been assumed.

Example III

To demonstrate that a complete recovery of lupulin from hops is not attained by the process of U.S. Patent No. 2,833,652 with subsequent loss of substantial amounts of the lupulin, the example of the patent was repeated and the A, B, C and D fractions were analyzed as in Example II. The results are sumarized in Table II.

TABLE II

| Analysis | Fraction A, 12 mesh | | Fraction B, 12-50 mesh | | Fraction C, 50-100 mesh | | Fraction D, 100-200 mesh | |
| --- | --- | --- | --- | --- | --- | --- | --- | --- |
| | Dried, percent | Percent total resin | Dried, percent | Percent total resin | Dried, percent | Percent total resin | Dried, percent | Percent total resin |
| Total resins | 3.12 | | 8.25 | | 48.4 | | 72.3 | |
| Soft resins | 2.98 | 95.5 | 7.91 | 96.0 | 46.2 | 95.2 | 68.5 | 94.7 |
| Humulon (Spectrophotometric analysis) | 1.15 | 36.9 | 3.15 | 38.1 | 18.0 | 37.2 | 27.2 | 37.5 |
| β-Component | 1.83 | 58.6 | 4.76 | 57.7 | 28.2 | 58.2 | 41.3 | 57.2 |
| Hard resins | 0.14 | 4.48 | 0.34 | 4.12 | 2.2 | 4.5 | 3.8 | 5.25 |
| Bitter value according to Wöllmer | 1.36 | | 3.68 | | 21.1 | | 31.8 | |

According to the said patent, fractions A and B are discarded. As the analysis of fractions A and B shows upon conversion to percent total resins, the quality of the discarded bitter principles is the same as the hops resins of fractions C and D, particularly as seen by the humulon content which is 80 to 85% (depending on the value of the β-component) of the bitter value according to the Wöllmer formula. Therefore, there was not obtained a complete recovery of the lupulin by the process of Patent No. 2,833,852.

Example IV

Brewing tests were performed in a brewery with the hops concentrate of the invention and with raw hops in order to demonstrate the excellent quality of the hops concentrate. To form a standard brew, 80 hectoliters of würze, with a total of 20 kgm. of raw hops containing 15.0% total resins water-free, were boiled for 90 minutes and under the same conditions 3.34 kgm. of hops concentrate having a total resin content of 67.5% water-free were boiled in another brew. The amount of hops concentrate was 25% less than the normal amount used based on the total resin content. The further treatment of würze, the fermentation and the storage of the beer until bottled was carried out under identical conditions. The finished beers were analyzed and the results are in Table III.

TABLE III

| | Standard Brew | Test Brew |
| --- | --- | --- |
| Spec. Weight | 1.01716 | 1.01709. |
| Extract, apparent | 4.37% | 4.35%. |
| Extract, actual | 6.12% | 6.06%. |
| Original würze | 13.35% | 13.35%. |
| Alcohol | 3.76% | 3.79%. |
| Real degree of fermentation | 54.2% | 55.0%. |
| Coagulatable nitrogen | 1.82 mg./100 ml. Beer | 1.72 mg./100 ml. |
| Isohumulons (Klopper) | 30.1 mg./L | 29.2 mg./L. |
| Ammonium sulfate (Hartong) | 0.85 ml | 1.12 ml. |
| Foam (Ross and Clark) | 122 sec | 143 sec. |

The results of Table III show that even though 25% less hops were used than theoretically should be, the analytically determinable bitter essence (isohumulons) was the same as the standard brew. The beer produced from the hops concentrate of the invention was more stable against turbidity, etc., and the foam stability of the beer was considerably better than the standard beer. Moreover, taste tests showed that the beer produced from the hops concentrate was preferred because it had a finer, more noble bitter taste than the standard beer.

Various modifications of the process of the invention may be made without departing from the spirit or scope thereof, and it is to be understood that the invention is intended to be limited only as defined in the appended claims.

I claim:

1. A process for the preparation of a hops concentrate containing substantially all the lupulin in the hops comprising freezing the hops to a temperature of at least −10° C. wherein the lupulin forms distinct particles, comminuting the frozen hops with eddy streams of inert gas to a particle size of 200 to 6000 microns whereby the lupulin particles are freed from the hops, separating the comminuted hops into a coarse fraction containing no lupulin and a fine fraction containing substantially all the lupulin in the hops and recovering the fine fraction as the hops concentrate.

2. The process of claim 1 wherein the hops are frozen by evaporation of a low boiling substance.

3. The process of claim 1 wherein the frozen hops are comminuted in an inert gas whirlpool by eddies of an inert gas.

4. The process of claim 3 wherein the inert gas is carbon dioxide.

5. The process of claim 3 wherein the inert gas is air.

6. The process of claim 1 wherein the hops are frozen to a temperature of −15 to −30° C.

7. The process of claim 1 wherein the fine fraction containing lupulin is stored under an inert gas atmosphere.

8. A process for the preparation of a hops concentrate containing substantially all the lupulin in the hops comprising freezing the hops to a temperature below −10° C. whereby the lupulin forms distinct particles, comminuting the frozen hops to a particle size of 200 to 6000 microns at temperatures below −10° C. with eddy streams of an inert gas whereby the lupulin particles are freed from the hops, selectively sifting the comminuted hops into a coarse fraction containing no lupulin and a fine fraction containing substantially all the lupulin in the hops and recovering the fine fraction as the hops concentrate.

9. The process of claim 8 wherein the hops are frozen at about −15° C. and the eddy stream of the inert gas has a velocity of 100 meters per second.

10. The process of claim 8 wherein the hops are frozen at about −30° C. and the eddy stream of inert gas has a velocity of 50 meters per second.

11. The process of claim 8 wherein the inert gas is selected from the group consisting of air and carbon dioxide.

12. The process of claim 8 wherein the sifter has a mesh size of 200 to 500 microns.

13. A process for the preparation of a hops concentrate containing substantially all the lupulin in the hops comprising freezing the hops to a temperature below −10° C. whereby the lupulin forms distinct particles, comminuting the frozen hops to a particle size of 200 to 6000 microns at temperatures below −10° C. with eddy streams of an inert gas whereby the lupulin particles are freed from the hops, selectively sifting the comminuted hops into a coarse fraction containing no lupulin and a fine fraction containing substantially all the lupulin in the hops, and storing the fine fraction in the dark under an inert atmosphere whereby the fine fraction may be kept for long periods of time.

References Cited by the Examiner

UNITED STATES PATENTS

| | | | |
|---|---|---|---|
| 2,181,931 | 12/1939 | Wood | 99—50.5 |
| 2,191,838 | 2/1940 | Freiherr von Horst | 99—50.5 |
| 2,833,652 | 5/1958 | Naatz | 99—50.5 |

A. LOUIS MONACELL, *Primary Examiner.*

D. M. STEPHENS, *Assistant Examiner.*